(12) United States Patent
Sastri et al.

(10) Patent No.: US 6,301,629 B1
(45) Date of Patent: Oct. 9, 2001

(54) HIGH SPEED/LOW SPEED INTERFACE WITH PREDICTION CACHE

(75) Inventors: Bharat Sastri, Pleasanton; Thomas Alexander, San Jose; Chitranjan N. Reddy, Los Altos Hills, all of CA (US)

(73) Assignee: Alliance Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/034,537

(22) Filed: Mar. 3, 1998

(51) Int. Cl.[7] ..................................................... G06F 13/38
(52) U.S. Cl. .......................... 710/129; 710/127; 710/128
(58) Field of Search .................................... 710/127, 128, 710/129, 60; 711/118, 137, 117

(56) References Cited

U.S. PATENT DOCUMENTS

| | | | |
|---|---|---|---|
| 4,439,781 | * 3/1984 | Yano ....................................... | 347/151 |
| 4,878,166 | * 10/1989 | Johnson et al. ......................... | 710/127 |
| 5,606,709 | * 2/1997 | Yoshioka et al. ....................... | 710/127 |
| 5,687,371 | * 11/1997 | Lee et al. ................................. | 713/1 |
| 5,708,794 | * 1/1998 | Parks et al. ............................. | 711/154 |
| 5,710,892 | * 1/1998 | Goodnow et al. ...................... | 710/127 |
| 5,781,918 | * 7/1998 | Lieberman et al. .................... | 711/5 |
| 5,828,865 | * 10/1998 | Bell ....................................... | 710/127 |
| 5,935,232 | * 8/1999 | Lambrecht et al. ................... | 710/128 |
| 5,941,968 | * 8/1999 | Mergard et al. ....................... | 710/128 |
| 6,047,348 | * 4/2000 | Lentz et al. ............................ | 710/127 |
| 6,134,622 | * 10/2000 | Kapur et al. ........................... | 710/128 |
| 6,148,356 | * 11/2000 | Archer et al. .......................... | 710/127 |

OTHER PUBLICATIONS

Rambus Inc., The Future of 3D Memory, 1997.

* cited by examiner

Primary Examiner—Hiep T. Nguyen
(74) Attorney, Agent, or Firm—Stallman & Pollock LLP (57) ABSTRACT

The present invention provides a monolithic or discrete high speed/low speed interface that is capable of interfacing with the high speed subsystems of a data processing system and low speed subsystems of a data processing system. In one embodiment, the high speed/low speed interface subsystem of the present invention comprises a high speed interface for interfacing with high speed subsystems via a high speed bus, a low speed interface for interfacing with low speed subsystems via a low speed bus, a control circuitry coupled to both the high speed and low speed interfaces, and an internal bus coupled to the control circuitry and the high speed and low speed interfaces. The control circuitry controls the transfer of information between the interfaces. In a second embodiment of the present invention, the high speed/low speed interface subsystem of the present invention comprises all the elements of the first embodiment and a prediction unit. In a third embodiment of the present invention, the high speed/low speed interface subsystem comprises all the elements of the second embodiment and a memory controller. The embodiments of the present invention could be implemented with discrete components or could be implemented on a single semiconductor substrate.

4 Claims, 5 Drawing Sheets

HIGH SPEED/LOW SPEED INTERFACE WITH PREDICTION CACHE

BACKGROUND OF THE INVENTION

1. Field of the Invention

The present invention relates to data processing systems. In particular, the present invention relates to an interface that is capable of communicating with high speed and low speed sub-systems in a data processing system.

2. Discussion of the Related Art

To improve the performance of computer systems and to take advantage of the full capabilities of the CPUs, including their speed, used in these systems, there is a need to increase the speed by which information is transferred from the main memory to the CPU. Microprocessors are becoming faster as microelectronic technology improves. Every new generation of processors is about twice as fast as the previous generation, due to the shrinking features of integrated circuits. Unfortunately, memory speed has not increased concurrently with microprocessor speed. While Dynamic Random Access Memory (DRAM) technology rides the same technological curve as microprocessors, technological improvements yield denser DRAMs, but not substantially faster DRAMs. Thus, while microprocessor performance has improved by a factor of about one thousand in the last ten to fifteen years, DRAM speeds have improved by only 50%. Accordingly, there is currently about a twenty-fold gap between the speed of present day microprocessors and DRAM. In the future this speed discrepancy between the processor and memory will likely increase.

The factors affecting the speed of transferring information from the main memory, that typically includes DRAMs, are the speed discrepancy, as mentioned above, and the limited bandwidth of the currently available off-the-shelf DRAMs. The problem caused by the speed discrepancy is also known as the latency problem.

To reduce the latency problem, cache memory is used to cache the information. However, currently available cache memories have limited capacity. Accordingly, a small portion of the information stored in the main memory can be cached each time. Thus, if the information requested by the CPU is not in the cache, the main memory must be accessed to obtain the information.

An alternative solution is to increase the rate of transfer of the information between the CPU and the main memory. In another word, an alternative solution is to increase the bandwidth of the system. However, the presently available high bandwidth systems have an inherent problem caused by the limitation in the number of loads that can be connected to the high speed buses used in these systems. In addition, the presently available high speed buses are narrow.

Figure 1:
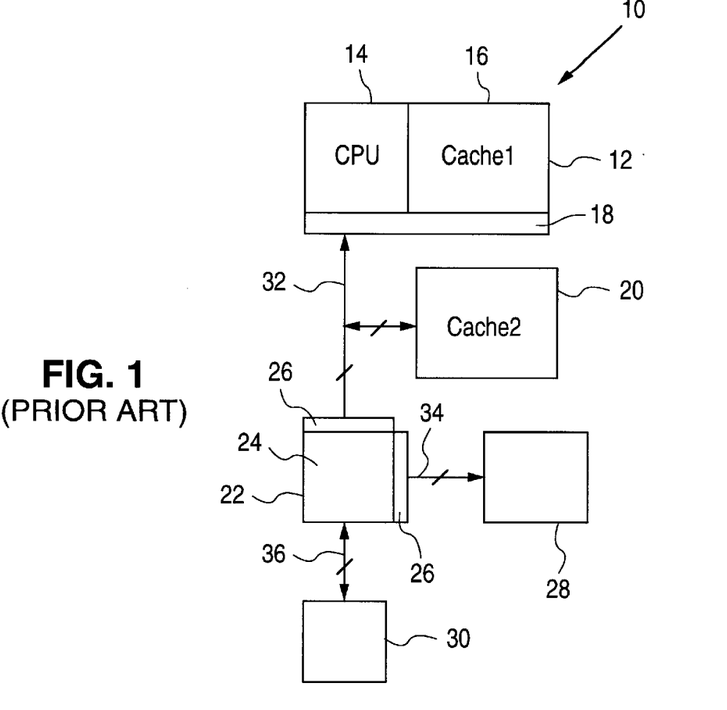
FIG. 1 is a block diagram of a presently available data processing system.

FIG. 1 is a block diagram of a presently available high bandwidth data processing system. This system is capable of high speed transferring of information between the CPU and the main memory. The system of FIG. 1 is generally designated by reference number 10. It includes a processing unit 12, cache memory II 20, memory controller 22, memory 28, and I/O controller 30. Processing unit 12 includes a CPU 14, a cache memory I 16, and a high speed interface 18. Memory controller 24 includes controller 24 and high speed interface 26. It should be mentioned that typically high speed interfaces 18 and 26 are identical. The processing unit 12 communicates with the memory controller 22 via high speed bus 32. In addition, memory controller 22 communicates with memory 28 and I/O controller 30 via high speed buses 34 and 36. Memory 28 includes specially designed high speed DRAMs (not shown).

High speed buses 32–36 are designed to transfer information at a very high speed. However, as mentioned above, the currently available high speed buses are very narrow. For example, the currently available buses have between 9 to 16 data lines. This means that at any time a maximum of 16 bits, or 2 bytes, of information can be transferred over these buses. However, since this information is being transferred at a very high speed, the resulting rate of transfer is very fast. For example, the currently available high speed buses are capable of transferring information at a speed between 500 Mhz to 1 GHz. This means that the rate of transfer of a 16 pin bus is between 1Gbyte/sec to 2 Gbyte/sec. Since these buses are operating at very high frequency, special interfaces must be provided for these buses. RAMBUS Inc. of Mountain View, Calif., has designed a high speed interface that is capable of interfacing with high speed buses. Numerous manufacturers are manufacturing the RAMBUS high speed interface under a license from RAMBUS, Inc. In system 10, high speed interfaces 18 and 26 are used to enable the system to take advantage of the high speed buses 32–36.

The presently available high speed interfaces have limitations that ultimately limit the performance of system 10. For example, only two loads can be connected to the presently available high speed interface. The presently available RAMBUS high speed interface can support a maximum of two loads, such as two high speed RAMBUS memories. This limits the amount storage available in the high speed data processing systems. Consequently, in systems that require the connection of more than two loads to each subsystem, more than one high speed interface must be used, which increases the cost of the systems.

Finally, to take advantage of the capabilities of the high speed buses, specially designed DRAMs must be used in memory 28. These DRAMs are expensive and their use would increase the cost of system 10.

Thus, there is need for a subsystem that is capable of interfacing with presently available "low speed, low cost" subsystems, such as main memories that incorporate presently available DRAMs, and high speed subsystems without causing a degradation in the performance of the high bandwidth data processing systems.

SUMMARY AND OBJECTIVES OF THE INVENTION

It is the object of the present invention to provide a high speed/low speed interface subsystem that provides the capability of interfacing with high speed and low speed subsystems in a high bandwidth data processing system, while maintaining a high information transfer rate.

It is the object of the present invention to provide a high speed/low speed interface subsystem that provides the capability of interfacing with high speed subsystems and low speed, low cost subsystems in a high bandwidth data processing system, while maintaining a high information transfer rate.

It is another object of the present invention to provide a high speed/low speed interface subsystem that is capable of substantially reducing DRAM latency.

It is another object of the present invention to provide a high speed/low speed interface subsystem that is capable of connecting to more than two loads.

It is another object of the present invention to provide a high speed/low speed interface subsystem that is capable of interfacing with high speed and low speed subsystems and is capable of connecting to more than two loads.

It is another object of the present invention to provide a high speed/low speed interface subsystem that is capable of interfacing with high speed and low speed subsystems and is capable of substantially reducing DRAM latency.

It is another object of the present invention to provide a high speed/low speed interface subsystem that is capable of interfacing with high speed and low speed subsystems, is capable of substantially reducing DRAM latency, and is capable of connecting to more than two loads.

It is another object of the present invention to provide a monolithic or a discrete subsystem including a high speed interface, a low speed interface, and a cache prediction unit that provides the capability of interfacing with low speed subsystems and high speed subsystems via low speed buses and high speed buses, respectively, while maintaining a high information transfer rate.

Finally, it is an object of the present invention to provide a monolithic or discrete subsystem including a high speed interface, a low speed interface, a cache prediction unit, and memory controller unit that provides the capability of interfacing with low speed subsystems and high speed subsystems via low speed and high speed buses, respectively, while maintaining a high information transfer rate.

The present invention provides a monolithic or discrete high speed/low speed interface that is capable of interfacing with the high speed subsystems via a narrow high speed bus and low speed subsystems via a low speed multi-level interleave wide bus in a data processing system, while maintaining a high information transfer rate.

In one embodiment, the high speed/low speed interface subsystem of the present invention comprises a high speed interface for interfacing with high speed subsystems via a high speed bus, a low speed interface for interfacing with low speed subsystems via a low speed bus, a control circuitry coupled to both the high speed and low speed interfaces, and an internal bus coupled to the control circuitry and the high speed and low speed interfaces. The information is transferred between the low speed interface and the low speed subsystems at a first transfer rate. The information is transferred between the high speed interface and the high speed subsystems at a second transfer rate. The first and second information transfer rate are substantially matched to maintain the high transfer rate of the system incorporating the first embodiment of the present invention. The control circuitry controls the transfer of information between the interfaces.

In a second embodiment of the present invention, the high speed/low speed interface subsystem of the present invention comprises a high speed interface for interfacing with high speed subsystems via a high speed bus, a low speed interface for interfacing with low speed subsystems via a low speed bus, a prediction unit coupled to the high speed and low speed interfaces, a control circuitry coupled to both the high speed and low speed interfaces, and an internal bus coupled to the control circuitry, the prediction unit, and both the high speed and low speed interfaces. The information is transferred between the low speed interface and the low speed subsystems at a first transfer rate. The information is transferred between the high speed interface and the high speed subsystems at a second transfer rate. The first and second information transfer rate are substantially matched to maintain the high transfer rate of the system incorporating the second embodiment of the present invention.

The control circuitry generates the control signals for the operation of the high speed/low speed interface subsystem.

The prediction unit of the second embodiment of the present invention includes identifying means for predicting the next memory block to be accessed by a processing unit, and storing means for storing the next memory block. The prediction unit further includes a controller coupled to said identifying means and said storing means.

In a third embodiment of the present invention, the high speed/low speed interface subsystem comprises all the elements of the second embodiment and a memory controller.

The embodiments of the present invention could be implemented with discrete components or could be implemented on a single semiconductor substrate.

DETAILED DESCRIPTION OF THE EMBODIMENTS

The present invention now will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It should be mentioned that through out this disclosure, like numbers refer to like elements.

The present invention provides a monolithic or discrete high speed/low speed. The interface of the present invention is capable of interfacing with the high speed subsystems via a narrow high speed bus and low speed subsystems via a low speed bus, while maintaining a high information transfer rate. The low speed bus is a multi-level interleave wide bus. The information transfer rate is typically defined in terms of the number of bytes information transferred per second. However, it could also be defined in the number of bits of information transferred per second. In particular, the present invention provides a subsystem that is capable of providing a means for a high speed transferring of information to and from the CPU in a data processing systems without a need for specially designed high speed memory subsystems, such as RAMBUS DRAM based memory subsystem. A high speed subsystem is one that is capable of interfacing with a high speed bus. The subsystem of the present invention can be implemented using discrete elements, or it can be implemented on a single semiconductor substrate.

Figure 2:
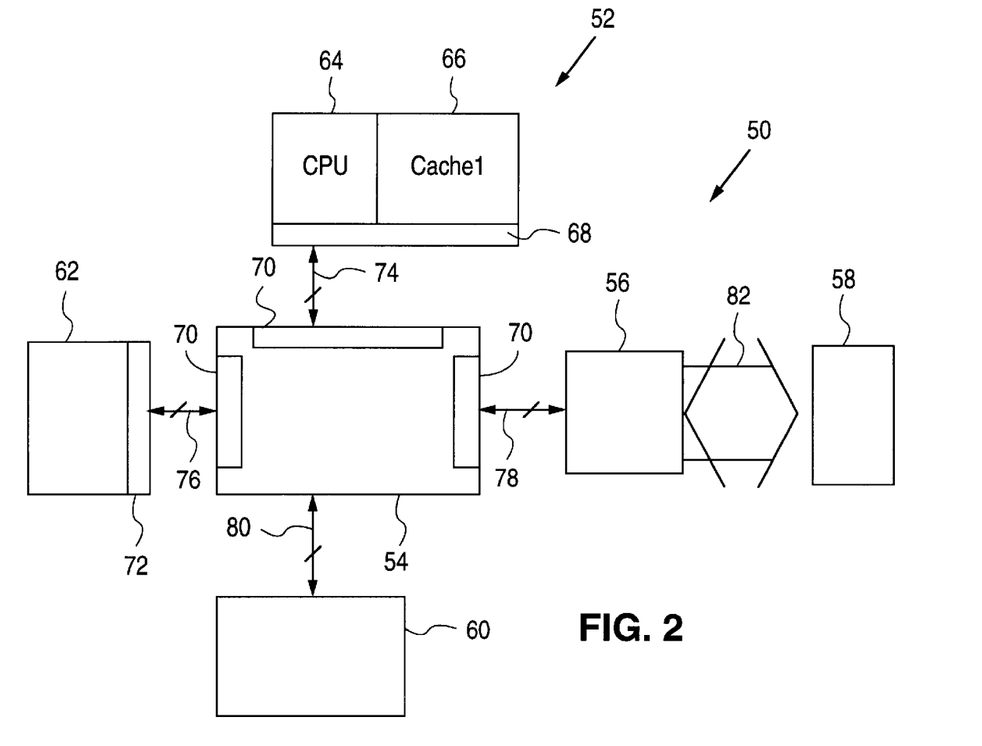
FIG. 2 is a block diagram of a data processing system that incorporates the high speed/low speed interface of the present invention.

Referring now to FIG. 2, a data processing system 50 that incorporates the high speed/low speed interface of the present invention is shown. Data processing system 50 includes a processing unit 52, a memory controller 54, a high speed/low speed interface 56, a main memory 58, an I/O controller 60, and a graphics controller 62.

Processing unit 52 includes a CPU 64, a cache 66, and a high speed interface 68. Memory controller 54 includes a plurality of high speed interfaces. The number of high speed interface 70 depends on the number of high speed subsystems that communicate with memory controller 54. Main memory 58 includes DRAMs (not shown). It should be mentioned that the DRAMs incorporated in main memory 58 are the readily available, off-the-shelf, low speed DRAMs. This is in contrast to the use of specially designed high speed DRAMs, such as RAMBUS or MOSYS DRAMs, used in data processing system 10 of FIG. 1. The graphics controller 62 also includes a high speed interface 72. High speed interfaces 68, 70, and 72 are similar to high speed interfaces 18 and 26 in FIG. 1. As mentioned above, an example of a high speed interface is the one designed by RAMBUS, Inc., Mountain View, Calif.

The transfer of information between memory controller 54 and the processing unit 52 and the graphics controller 62 occurs via high speed buses 74 and 76, respectively. The transfer of information between memory controller 54 and the main memory 58 occurs via a high speed bus 78, the high speed/low speed interface 56, and bus 82. High speed buses 74–78 are identical to high speed buses 32 and 34 in FIG. 1. As mentioned before, they are designed to transfer information at a very high rate. They operate at a very high speed, but the number bits of information transferred over these buses are limited. It is clear to one knowledgeable in the art that as the higher speed buses are available they can be used in the present invention.

Bus 82 has a much lower operating speed compared to the operating speed high speed buses 74–78. However, to maintain a high information transfer rate in system 50, bus 82 is designed such that its transfer rate substantially matches or equals the transfer rate of the high speed buses 74–78. Thus the overall performance of system 50 is not affected.

Bus 82 is a multi-level interleaved low speed bus. A multi-level interleaved bus is one that is comprised of a plurality of standard buses, such as standard 8-bit or 16-bit buses. It should be mentioned that any reference to low speed in this application is entirely relative. In the present invention, the speed of a high speed bus is about one order of magnitude higher than the speed of a low speed bus. For example, The currently available 70–100 MHz buses are considered as low speed buses by the present invention. Obviously, one knowledgeable in the art realizes that as technology advances, the buses with much higher speed could be considered as low speed buses in contrast with the state of the art high speed buses. However, the relative low speed of the bus should not be construed as a limitation since the overall transfer rate of the bus is crucial in any data processing system.

The transfer rate of a bus depends on its speed and its width. The width of a bus determines the number of bits that can be transferred on the bus at any time. In the present invention, bus 82 is at least a 64 bit wide bus. Bus 82 could also be a 128 bit (i.e., 16 byte) bus, a 256 bit (i.e., 32 byte) bus, a 512 bit (i.e., 64 byte) bus, a 1024 bit (128 byte) bus, or wider. A wider bus allows for the transferring of a much larger block of information at any given time, thus increasing its overall transfer rate. For example, the transfer rate of a 100 MHz bus that is 64-bit wide is 800 Mbyte/sec and the transfer rate of a 100 MHz bus that is 128-bit wide is 1.6 Gbyte/sec. Clearly one knowledgeable in the art can detect a trend here. As the bus becomes wider, its transfer rate approaches the transfer rate of a high speed bus, such as the one described above.

Main memory 54 also communicates with the I/O interface 60 via bus 80, which is a conventional low speed bus. One knowledgeable in the art realizes that the communication between the memory controller 54 and I/O controller 60 can occur at a very high speed to warrant the use of high speed buses. In this case bus 80 would be a high speed bus, and a high speed interface on either sides of bus 80 would be needed. The high speed interfaces would reside in memory controller 54 and I/O controller 60.

High speed interfaces 68–72 are similar to high speed interfaces 18 and 26 in system 10 of FIG. 1. As mentioned before, an example of a high speed interface is the interface designed and manufactured by the RAMBUS Incorporation of Mountain View, Calif.

The data processing system 50 is capable of transferring information between CPU 64 and main memory 58 or graphics controller 62 at a very high speed without the need for any specially designed high speed main memory or high speed graphics controller. This is made possible with the use of the high speed/low speed interface 56 of the present invention and bus 82. The details of the high speed/low speed interface of the present invention will be described next.

Figure 3:
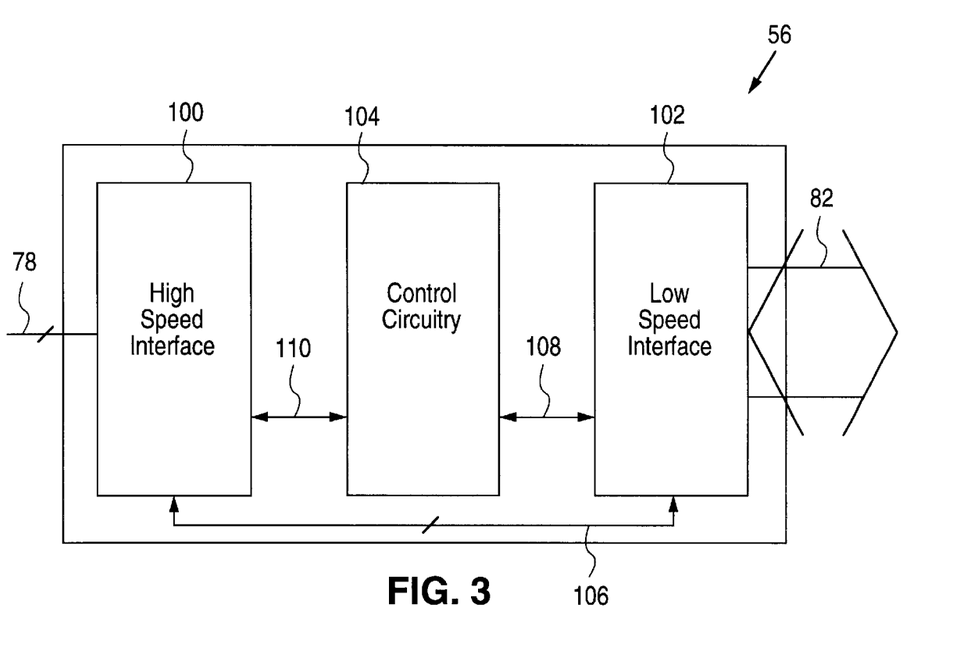
FIG. 3 is a block diagram of the first embodiment of the high speed/low speed interface of the present invention.

Referring now to FIG. 3, a block diagram of the first embodiment of the high speed/low speed interface 56 is illustrated. High speed/low speed interface 56 includes a high speed interface 100, a low speed interface 102, and a controller 104. The high speed interface 102 is identical to the high speed interfaces 68–72. It communicates with the external subsystems, such as the memory controller 54, via the high speed bus 78.

The low speed interface 102 is a conventional I/O interface that provides the capability of interfacing with the low speed subsystem via bus 82. The control circuitry 104 provides the necessary control signals for the operation of both high speed and low speed interfaces 100 and 102. The control circuitry 104 communicates with the low speed interface 102 and the high speed interface 104 signal lines 108 and 110, respectively.

Figure 4:
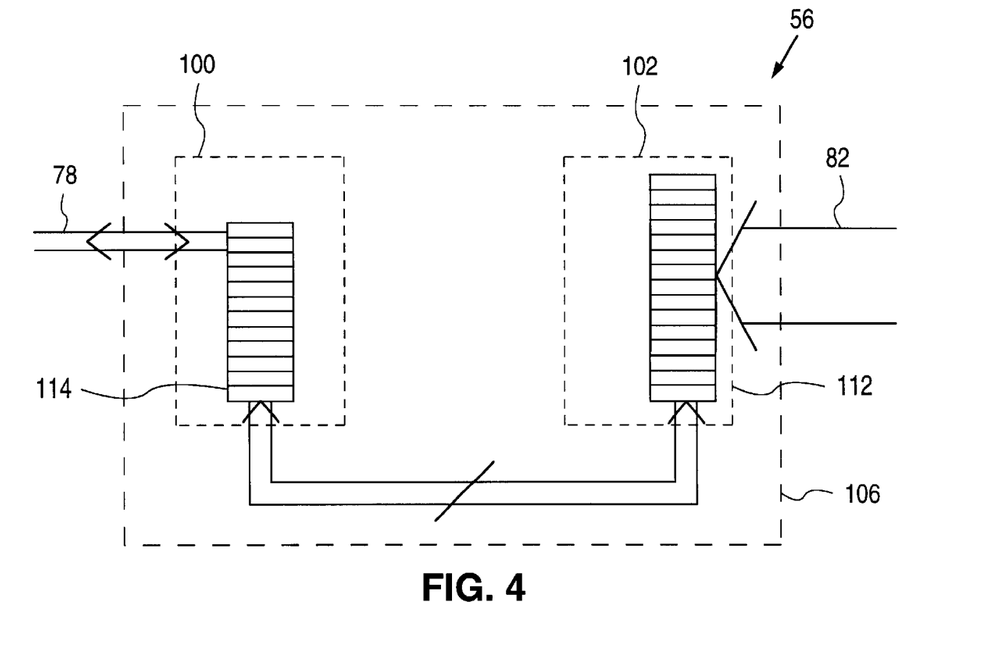
FIG. 4 is a block diagram of a portion of the high speed/low speed interface of FIG. 3, in which the internal connection between the high speed interface and the low speed interface is illustrated.

The operation of the high speed/low speed interface 56 is better described with reference to FIGS. 2–4. FIG. 4 is a block diagram of a portion of interface 56, in which the internal connection between the high speed interface 100 and the low speed interface 102 is illustrated. In addition, the relevant part of the high speed and low speed interfaces 100 and 102 are illustrated in FIG. 4.

As it can be seen in FIG. 4, the low speed interface 102 includes a parallel in/serial out FIFO 112. FIFO 112 stores the information transferred on bus 82. The information is stored in FIFO 112 in parallel. The output of FIFO 112 includes the same number of bits as by the high speed bus 78. Thus, if high speed bus 78 is a 9-bit wide bus, the output of FIFO 112 includes 9 bits.

High speed interface also includes a parallel in/parallel out FIFO 114. The output of FIFO 114 includes the same number of bits as the high speed bus 78. The communication between FIFO 112 and FIFO 114 occurs via bus 106. The information from FIFO 112 is stored in FIFO 114. The output of FIFO 114 is connected to BUS 78. FIFO 114 outputs information at a rate substantially identical to the speed of bus 78. In addition, to take advantage of the speed of bus 78, the rate of transfer of information between FIFO 112 and FIFO 114 is also substantially matched with the speed of bus 78. Thus, the high speed transfer rate of system 50 is maintained to prevent any degradation in the overall performance of the system. This is a huge advantage over the presently available high speed systems. The presently available high speed systems are not able to take advantage of the readily available, off-the-shelf, low speed components, such as the DRAMs, and still maintain the high speed transfer rate of the information between the subsystems.

An alternative embodiment of the present invention provides the capability of predicting the next main memory access and accessing the main memory before a main memory access request is made while transferring information at a high transfer rate. The second embodiment of the present invention includes a prediction subsystem capable of predicting the next block of information to be accessed in the main memory by the other subsystems in system 50. For example, the prediction subsystem makes its decision by analyzing the memory access pattern of the CPU.

Figure 5:
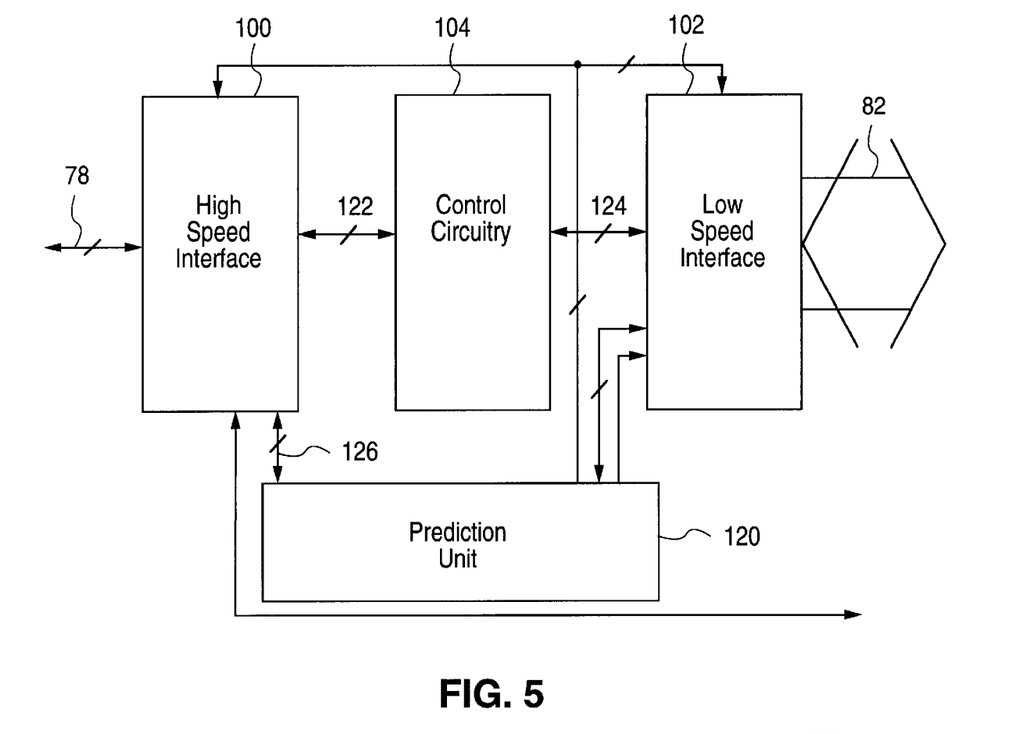
FIG. 5 is a block diagram of the second embodiment of the high speed/low speed interface of the present invention.

Referring now to FIG. 5, a block diagram of a second embodiment of the high speed/low speed interface 56 of the present invention is illustrated. The high speed/low speed interface 56 includes the high speed interface 100, the low speed interface 102, the control circuitry 104, and a prediction unit 120.

The control circuitry 104 provides the necessary control signals for the operation of the high speed interface 100, low speed interface 102, and prediction unit 120. The communication between control circuitry and the high speed interface 100, low speed interface 102, and prediction unit 120 occurs via bi-directional signal lines 112, 124, and 126. The information is transferred between high speed interface 100, low speed interface 102, and prediction unit 120 via internal bus 128.

Similar to the embodiment of FIG. 3, the low speed interface communicates with the main memory, or other low speed subsystems, via bus 82, The high speed interface communicates with the external subsystems, such as memory controller 54, via the high speed bus 78. Furthermore, similar to the embodiment of FIG. 3, the high speed/low speed interface of FIG. 5 provides the capability of using the off-the-shelf components, such as DRAMs, while maintaining a high transfer rate information in system 50.

Figure 6:
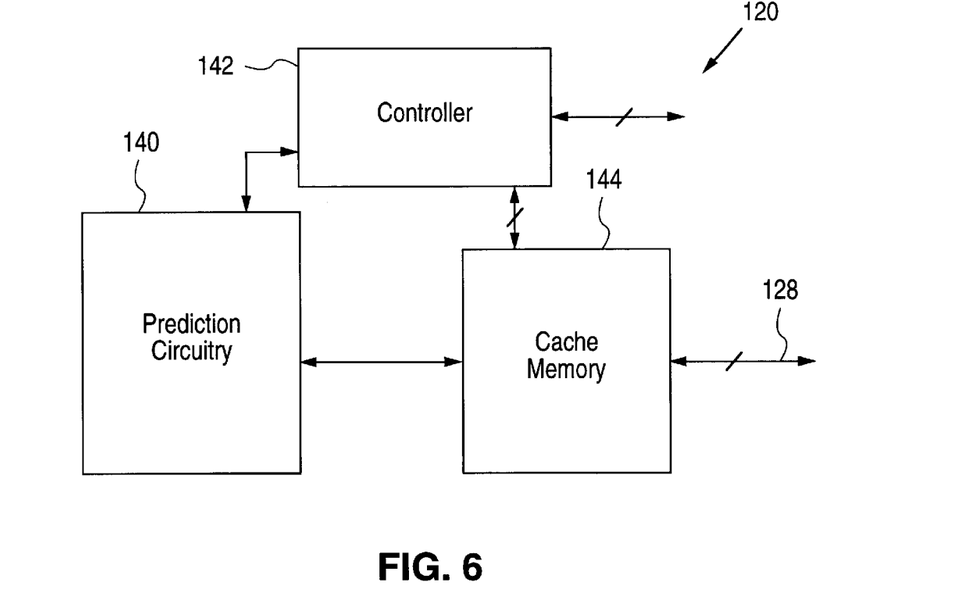
FIG. 6 is a detailed block diagram of the prediction unit 120 in FIG. 5.

Referring now to FIG. 6, a detailed block diagram of prediction unit 120 is illustrated. Prediction unit 120 includes a prediction circuitry 140, a controller 142, and a cache memory 144. Controller 142 generates the necessary control signals for the operation of the prediction unit 120. Generally, controller 142 generates the control signals in response to a memory request.

The prediction circuitry 140 is the prediction engine of prediction unit 120. It has the task of analyzing the history of memory requests made by a subsystem, such as the CPU, and predicting the next block that would be requested by the subsystem. There are several different prediction schemes that can be utilized by the prediction circuitry to predict the next block of information. Any one of those schemes can be used by prediction circuitry 120.

The predicted information is then fetched from the main memory and stored in cache memory 144. Cache memory 144 replaces cache 20 in FIG. 1. This cache is also referred to as the level II cache. Cache memory 120 could be implemented using SRAMs.

The prediction unit 120 could function in two modes. In its first mode of operation, the prediction unit 120 is completely responsible for all decisions made regarding the prediction and fetching of the next block of information. The prediction unit 120 predicts and fetches the next group of information based on its analysis of the history of memory access requests by a requesting subsystem. In this process, the prediction unit 120 analyzes the history of main memory accesses by the subsystem, typically a CPU, and based on the result of its analysis, it predicts the next block information, typically instructions, that would be accessed by the subsystem. The predicted block of information is then fetched from the main memory and is stored in cache 144. This mode of operation can also be called a non-demand mode of operation and is typically the default mode of operation of the prediction subsystem.

In a second mode of operation, the prediction unit 120 responds to a request by a software to fetch a block of information, typically data, from the main memory. The software requests the fetching of a block of information from the main memory before it needs it. The fetched block of information is stored in the cache memory 144 and is ready to be used by the requesting software. This mode of operation can also be called a demand mode of operation.

As discussed above, the prediction unit 120 is capable of predicting and fetching the next block of information that might be requested by a subsystem, such as the CPU. The fetched block of information is then stored in cache 144. The prediction unit 120 is also capable of predicting different pages of memory and loading them into the sense amplifiers in the DRAM array. The predicted pages of information are then ready to be accessed by a CPU or any other subsystem by enabling the transfer of the predicted page of information from the sense amps onto the I/O bus. The process of accessing information from a DRAM is known to one knowledgeable in the art. Therefore, it will not be discussed here to prevent any unnecessary complication of the description of the present invention.

The ability to predict pages of information and to read them into the sense amplifiers eliminates the typical precharge time and row access time associated with each memory access.

In addition to the above, prediction unit 120 is also capable of performing a write combine operation. In a write combine operation, the prediction unit 120 buffers a series of write operations before executing them. Thereafter, it rearranges the order of execution of the write operations to reduce the total write time. By rearranging the order of execution of the write operations, the prediction unit 120 sequentially executes those write operations that effect the same row of memory. For example, if four write operations are buffered by the prediction unit 120 and if the first and third write operations affect row A of the main memory and the second and fourth write operations affect row B of the main memory, the prediction unit 120 first executes the first and third write operation and then the second and fourth write operations. This way only two memory accesses are required, once to access row A and once to access row B.

In contrast, if the four write operations were to be executed in the order that they are buffered, four memory access would be necessary, first row A would be accessed to execute the first write operation, next row B would be accessed to execute the second write operation, next row A would be accessed to execute the third write operation, and finally, row B would be accessed to execute the fourth write operation. Clearly this capability would reduce the total write time.

Figure 7:
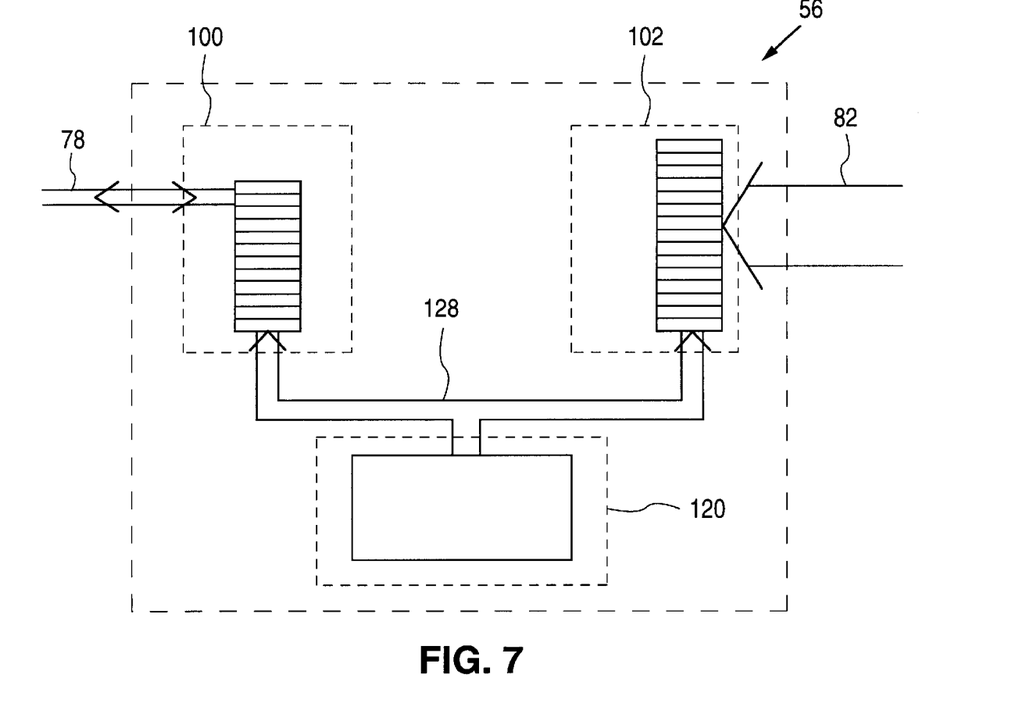
FIG. 7 is a partial block diagram of the interface of FIG. 5, in which the connection between the low speed interface, the high speed interface, and the prediction unit is illustrated.

The operation of the embodiment of FIG. 5 is better described by referencing FIGS. 5–7. FIG. 7 is a partial block diagram of interface 56, in which the connections between the low speed interface 102, the high speed interface 100, and the prediction unit 120 is illustrated. In addition, the relevant parts of the above elements are also illustrated in FIG. 7.

As shown in FIG. 7, the low speed interface 102 includes a FIFO 112 and the high speed interface 100 includes a FIFO 114. FIFOs 112 ands 114 were discussed in detail with reference to FIG. 4.

In operation, the prediction unit 120 predicts the next block of information. Thereafter, the controller initiates a memory access to fetch the predicted block of information. The predicted block of information is then fetched from the main memory using bus 82 and is stored in FIFO 112. The information is then read from FIFO 112 and is stored in cache memory 144. Upon a detection of a memory access request by the control circuitry 104, a request is sent to the prediction unit 120 by control circuitry 104 for the requested information. The controller 142 first looks for the requested information in the cache memory 144. If the information is stored in cache memory 144, it is sent to the high speed interface 100 via internal bus 128. The information is then sent to the requesting subsystem from the high speed interface 100 via bus 78.

If the requested information is not in cache memory 144, control circuitry 104 generates the necessary control signals to fetch the information from the main memory. The fetched information is transferred to FIFO 112 from the main memory via bus 82. The information is then sent from FIFO 112 to the high speed interface 100 via internal bus 128. High speed interface 100 transfers the received information to the requesting subsystem via bus 78. It should be mentioned that the rate of transfer of information from FIFO 112 to high speed interface 100 is substantially matched to the rate of transfer of information from the high speed interface 100 to the external subsystem via bus 78 to maintain the high transfer rate of the system.

It should be mentioned that the control signals generated by the control circuitry 104 to fetch the information from the main memory can also be generated by the controller 142 of the prediction unit 120.

Figure 8:
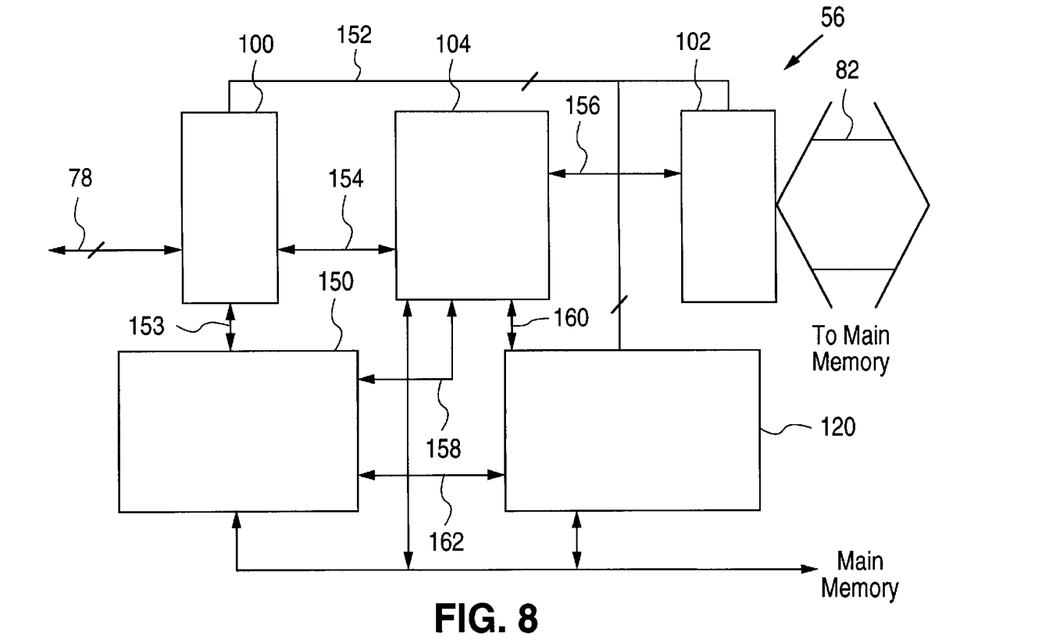
FIG. 8 is a block diagram of the third embodiment of the high speed/low speed interface of the present invention.

Referring now to FIG. 8, a third embodiment of the high speed/low speed interface 56 according to the present invention is illustrated. The embodiment of FIG. 8 includes all the elements of the embodiment of FIG. 5 and a memory controller of FIG. 2. High speed/low speed interface 56 includes the high speed interface 100, the low speed interface 102, the control circuitry 104, the prediction unit 120, and a memory controller 150. The difference between the memory controller 54 in FIG. 2 and memory controller 150 is that memory controller 150 does not include the high speed interfaces.

Similar to the high speed/low speed interface 56 of FIGS. 3 and 5, the low speed interface 102 receives information from the main memory (not shown) via low speed bus 82. An internal bus 152 is provided for the communication of information between low speed interface 102, high speed interface 100, and prediction unit 120. Memory controller 150 receives command signals from the CPU (not shown) via bus 78, high speed interface 100, and signal lines 153.

The control circuitry 104 generates the necessary control signals for the operation of the high speed/low speed interface 56. These signals are communicated to different blocks of high speed/low speed interface 56 via signal lines 154–160. In addition, memory controller 150 and prediction unit 120 exchange handshaking signals via signal line 162.

Although, one high speed interface is shown in the embodiments of FIGS. 3, 5, and 8, it is understood that more than one high speed interfaces, more than one low speed interfaces 102, more than one buses 82 and 78 can be provided in these embodiments.

Figure 9:
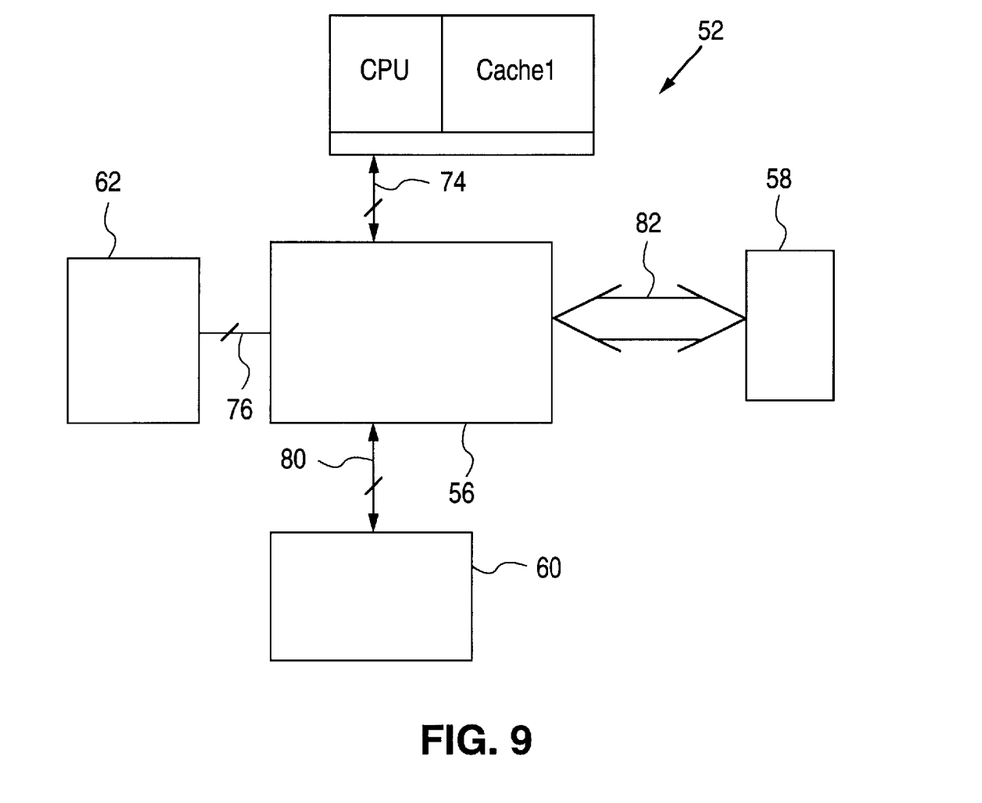
FIG. 9 is a block diagram of a data processing system that incorporates the high speed/low speed interface of FIG. 8.

The operation of the embodiment of FIG. 8 is better described with reference to FIGS. 6, 8 and 9. FIG. 9 is a block diagram of a data processing system that incorporates the third embodiment of high speed/low speed interface 56. FIG. 9 includes a processing unit 52, a high speed/low speed interface 56 according to the third embodiment of the present invention, a main memory 58, a graphics controller 62, and an I/O controller 60. The main memory 58 communicated with the high speed/low speed interface 56 via bus 82. The high speed/low speed interface 56 communicates with the processing unit 52 via the high speed bus 74. It also communicates with the graphics controller 62 and the I/O controller 60 via buses 76 and 80. As mentioned before, bus 80 could be a high speed bus. It also could be similar to bus 82.

In operation, memory controller 150 receives a memory access request from processing unit 52. This request is passed to the controller circuitry 104. The controller circuitry 104 first requests the information from the prediction unit 120. If the requested information is in cache 144, it will be sent to the processing unit via bus 152, high speed interface 100, and bus 78 as described above. If requested information is not in cache 144, the control circuitry 104 fetches the information from the main memory 58 as described above with respect to the embodiment of FIG. 5.

Again, the control circuitry 104 or the controller 144 can initiate the fetching of the information from the main memory 58.

Any of the embodiments of the present invention discussed herein could also include a programmable clock generator. The programmable clock generator includes a clock signal generating means, such as a phase locked-loop ("PLL") circuitry, to generate clock signals and a means for detecting and receiving incoming clock signals. The programmable clock generator communicates with the high speed subsystems via the high speed bus, FIFO connected to the high speed bus, and internal signal paths between the FIFO and the clock generator. For example, in the interface of FIG. 8, the programmable clock generator communicates with the high speed subsystems via signal lines 153, FIFO 100, and bus 78. The means for detecting and receiving a clock signal is capable of receiving clock signals from the high speed subsystems.

The clock signal generating means generates reference clock signals for the operation of the high speed/low speed interface. The generation of the reference clock signals eliminates any possibility of information skewing or sampling errors.

In addition, the clock signal generating means generates a synchronizing (or source) clock signal for synchronization of transfer of information during each information transfer between the high speed/low speed interface of the present invention and a high speed subsystem, such as a CPU. The synchronizing clock signal is transmitted along with the information.

When the interface of the present invention is on the receiving end of the information, the means for detecting and receiving incoming clock signals detects the clock signal from the high speed subsystems, such as the CPU. Upon detecting the synchronization clock signal, the clock signal generating means generates the necessary clock signals for the proper handling of the information being transmitted to the interface of the present invention.

Figure 10:
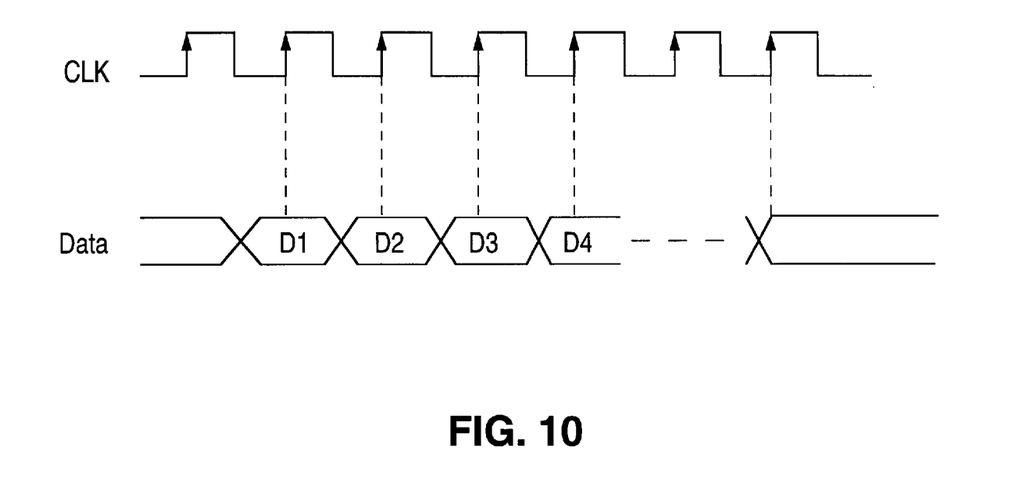
FIG. 10 is a typical timing diagram for one typical session of information transfer in a data processing system in accordance to the present invention.

A typical timing diagram for one typical session of information transfer is illustrated in FIG. 10. The source of information could be the high speed/low speed interface of the present invention or a high speed subsystem, such as a CPU. It is understood that the information sent by the high speed/low speed interface of the present invention is the one that has been retrieved from the main memory.

In operation, as shown in FIG. 10, the transmitting side (i.e., the interface of the present invention or the CPU) sends a synchronizing clock signal CLK before it transmits the information. Thereafter, the transmitting side transmits packets of information, such as data, on every rising edge of the synchronizing clock signal. Once the receiving end receives the synchronizing clock signal CLK, it knows that packets of information will follow on every rising edge of the synchronizing clock signal. Although, the timing diagram of FIG. 10 shows that the information is transmitted on every rising edge of the clock signal, it is understood that the information can also be transmitted on every falling edge of the clock pulse or on every rising and falling edge of the clock pulse.

The instruction for the receiving side to look for information after receiving the synchronizing clock signal can be loaded into the receiving subsystem as part of the boot up process.

As mentioned above, the transmission of the information, such as data or instructions, in synchronous with the synchronizing clock signal prevents any skewing of information during its transfer from the transmitting side to the receiving side.

The present invention is now described with reference to specific embodiments. Other embodiments of the present invention are apparent to one knowledgeable in the art. For example, in the embodiment of FIG. 8, the memory controller 150 can be integrated in control circuitry 104 or the controller 144 of the prediction unit 120.

Although, in describing the present invention specific terms are employed, they are used in a generic and descriptive sense only and not for purposes of limitation. The scope of the present invention is set forth in the following claims.

What is claimed is:

1. A high speed/low speed data processing system comprising:
   a processing unit that includes a high speed interface;
   a memory controller that includes a plurality of high speed interfaces;
   a first high speed bus, having a first data bandwidth, connected between the high speed interface of the processing unit and a first of the high speed interfaces of the memory controller for transfer of information between the processing unit and the memory controller at an information transfer rate;
   a high speed subsystem that includes a high speed interface;
   a second high speed bus, having the first data bandwidth, connected between the high speed interface of the high speed subsystem and a second high speed interface of the memory controller for transfer of the information between the high speed subsystem and the memory controller at the information transfer rate;
   a high speed/low speed interface system that includes a high speed interface and a low speed interface;
   a third high speed bus, having the first data bandwidth, connected between the high speed interface system and a third high speed interface of the memory controller for transfer of information between the high speed/low speed interface system and the memory controller at the information transfer rate.
   a low speed subsystem that includes a low speed interface; and
   a low speed bus connected between the low speed interface of the low speed subsystem and the low speed interface of the high speed/low speed interface system for transfer of information between the low speed subsystem and the high speed/low speed interface system, the low speed bus having a second bandwidth that is greater than the first bandwidth such that information is transferred between the low speed subsystem and the high speed/low speed interface system at the information transfer rate.

2. The high speed/low speed data processing system as in claim 1, and wherein the high speed interface of the high speed/low speed interface system includes a first-in-first-out (FIFO) memory having its output connected to receive information from the third high speed, and
   wherein the low speed interface of the high speed/low speed interface system includes a second FIFO memory having its input connected to the low speed bus, and
   wherein the high speed/low speed interface system further includes and intense bus connected to transfer information between the first and second FiFO memories and control circuitry connected to the high speed interface and the lower speed interface as the high speed/low speed interface system to provide control signals thereto for controlling transfer of the information between the first and second FIFO memories via the internal bus.

3. The high speed/low speed data processing system as in claim 2, and wherein the high speed/low speed interfaced system further comprises a prediction unit connected to provide prediction signals to the control circuitry for predicting information to be assessed in the low speed system.

4. The high speed/low speed data processing system as in claim 3, and wherein the prediction unit comprises prediction circuitry that analyzes the history of access requests made by the processing unit for access to the low speed subsystem and that uses the history to predict the next access request to be made by the processing unit for access to the low speed subsystem.

* * * * *